(12) United States Patent
Paul et al.

(10) Patent No.: US 7,384,998 B2
(45) Date of Patent: Jun. 10, 2008

(54) TRANSDERMAL DRUG DELIVERY DEVICE COMPRISING AN ACRYLIC BLOCK COPOLYMER-BASED ADHESIVE

(75) Inventors: Charles W. Paul, Madison, NJ (US); Cynthia L. Meisner, Monmouth Junction, NJ (US)

(73) Assignee: National Starch and Chemical Investment Holding Corporation, New Castle, DE (US)

( * ) Notice: Subject to any disclaimer, the term of this patent is extended or adjusted under 35 U.S.C. 154(b) by 337 days.

(21) Appl. No.: 11/043,474

(22) Filed: Jan. 26, 2005

(65) Prior Publication Data

US 2005/0228135 A1 Oct. 13, 2005

(51) Int. Cl.
*C08K 5/06* (2006.01)

(52) U.S. Cl. ............... 524/376; 524/377; 524/505

(58) Field of Classification Search ........ 524/376, 524/377, 505
See application file for complete search history.

(56) References Cited

U.S. PATENT DOCUMENTS

| | | | |
|---|---|---|---|
| 3,649,579 A | 3/1972 | Gobran et al. | |
| 3,784,502 A | 1/1974 | Gobran et al. | |
| 3,787,531 A | 1/1974 | Dahlquist et al. | |
| 5,064,717 A | 11/1991 | Suzuki et al. | |
| 5,143,961 A | 9/1992 | Scholl et al. | |
| 5,292,795 A | 3/1994 | Southwick et al. | |
| 5,403,658 A | 4/1995 | Southwick et al. | |
| 5,679,762 A | 10/1997 | Yoshida et al. | |
| 6,310,175 B1 | 10/2001 | Kobayashi et al. | |
| 6,734,256 B1 | 5/2004 | Everaerts et al. | |
| 2003/0149195 A1 | 8/2003 | Dar et al. | |

FOREIGN PATENT DOCUMENTS

| | | |
|---|---|---|
| EP | 349270 | 1/1990 |
| EP | 0 994 701 | 1/1999 |
| EP | 1 008 640 | 6/2000 |
| EP | 1 094 086 | 4/2001 |
| EP | 1 132 410 | 9/2001 |
| JP | 10-298248 | 11/1998 |
| JP | 11-302617 | 11/1999 |
| JP | 11-323363 | 5/2001 |
| WO | WO 00/39233 | 7/2000 |
| WO | WO 02/26847 | 4/2002 |

OTHER PUBLICATIONS

Mancinelli, Paul A., "Advancements in Acrylic HMPSA'S Via Block Copolymer Technology", Materiaux et Techniques—Mar.-Apr. 1990, pp. 41-46.

Kakehi, Takamaro; Yamashita, Masahiro; Yasuda, Hajime; "Syntheses and Adhesion Properties of Novel Syndiotactic Block Copolymers of Alkyl (Meth) Acrylate with Methacrylic Acid and its Analogues", Reactive and Functional Polymers 46 (2000) pp. 81-94.

*Primary Examiner*—Bernard Lipman
(74) *Attorney, Agent, or Firm*—Cynthia L. Foulke

(57) ABSTRACT

High performance, low viscosity hot melt adhesives are obtained using acrylic block copolymers. The level of acrylic block copolymer in the adhesive formulation is less than 50% by weight.

9 Claims, 1 Drawing Sheet

Figure 1:
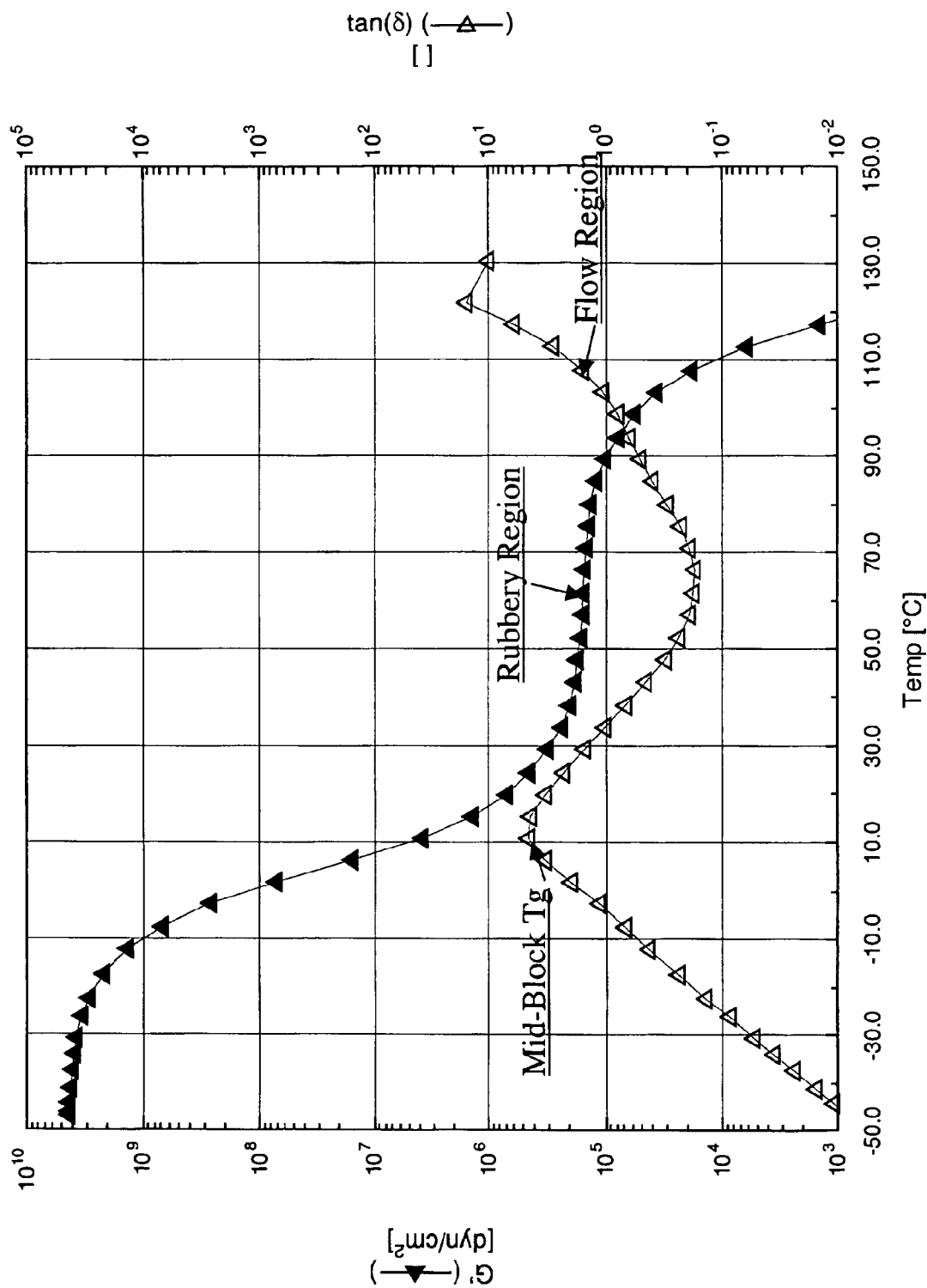

TRANSDERMAL DRUG DELIVERY DEVICE COMPRISING AN ACRYLIC BLOCK COPOLYMER-BASED ADHESIVE

FIELD OF THE INVENTION

The invention relates to high performance, low viscosity hot melt adhesives comprising acrylic block copolymers.

BACKGROUND OF THE INVENTION

Typical acrylic pressure sensitive adhesive formulations are copolymers of alkyl ester monomers and a functional monomer such as acrylic acid. These adhesives, however, are generally low in adhesion. While such adhesives are conventionally formulated with low levels of tackifiers (5-30%) to improve their tack and peel, tackification results in loss of heat resistance and poor aging properties. Moreover, acrylics designed for hot melts have typically been poor in shear even without tackification.

Block acrylics have been synthesized for hot melt applications to improve heat resistance, but have exhibited relatively poor adhesion. This is due to the presence of a hard block phase that stiffens the acrylic to a degree such that grab and tack are insufficient.

There continues to be a need in the art for improved acrylic polymer compositions that can be used to prepare pressure sensitive hot melt adhesive compositions that can be formulated with sufficient adhesion for applications such as industrial tapes and dermal applications.

The current invention fulfills this need.

SUMMARY OF THE INVENTION

The invention provides a hot melt adhesive comprising an acrylic block copolymer, wherein the acrylic block copolymer is present in the composition in amounts of less than about 50% by weight based on the weight of the adhesive composition. The adhesive of the invention will also preferably contain a tackifier and/or diluent. A preferred diluent for use in the practice of the invention is polypropylene glycol. The adhesives of the invention may advantageously be formulated for low temperature application.

Block copolymers that may be used in the practice of the invention will generally be multiblock polymers wherein greater than about 50 weight % of the polymer comprises at least 2 hard blocks per molecule. Examples of block copolymers include those having the formula -A-B-A- and $(-A-B-)_n-X_m$. Particularly preferred are block copolymers of the formula $-[A1]-[B]-[A2]-$. In the above representative formulations, A, A1 and A2 each represents a polymer block having a glass transition temperature (Tg) of greater than about 30° C. (also referred to as a hard block) and B represents a polymer block having a Tg of less than about 20° C. (also referred to as a soft block) and X represents a multifunctional coupling agent. Polymer block B will preferably be present in amounts of at least 50 weight %. In a particularly preferred embodiment, A1 and A2 is methyl methacrylate and B is n-butyl acrylate.

The invention also provides a process for bonding a substrate to a similar or dissimilar substrate using the adhesive.

The invention further provides articles of manufacture comprising the adhesive. The properties of the adhesive makes it particularly useful in the manufacture, of industrial tapes, in medical applications (e.g., for dermal applications) and in nonwoven applications.

BRIEF DESCRIPTION OF THE DRAWING FIGURE

FIG. 1 shows the rheology of an adhesive comprising 29.1% acrylic block copolymer, 58.4% tackifier and 12.5% of a diluent.

DETAILED DESCRIPTION OF THE INVENTION

All references cited herein are incorporated in their entireties by reference.

It has now been discovered that hot melt adhesives with high shear, aggressive tack and peel and low viscosity can be obtained using acrylic block copolymers, when low levels of acrylic block copolymers are used in the formulated adhesive. The acrylic block copolymers are formulated with different types and amounts of tackifiers and/or diluents to obtain the properties required for a desired end use.

The adhesives of the invention exhibit unique features that make them useful for a variety of applications. Features such as high heat resistance at low viscosity, high polarity for good adhesion to polar surfaces, high moisture vapor transmission rate and good weatherability. These features make the adhesives of the invention well suited as hot melt adhesives for medical (breathability) and industrial (heat, plasticizer, polar surface adhesion and weathering resistance) applications, as positioning adhesives (e.g., for sanitary napkins) that are breathable, non-staining, and transfer resistant, as bottle labeling adhesives with very low application temperatures and excellent clarity, and as elastic attachment adhesives with high creep resistance and lycra adhesion.

Adhesives of the invention may be formulated for application at low temperatures. A low application temperature hot melt adhesive formulation is one that can be applied at temperatures below about 300° F., more preferably at about 250° F. and down to about 200° F.

Adhesives having high levels of grab and tack, well beyond those of solution acrylics, may be obtained when low polymer levels are used. By low levels of acrylic block copolymers means amounts of less than about 50% by weight based on the weight of the adhesive composition. The block copolymer component will be present at levels of less than 50% by weight of the adhesive composition, more typically at levels of less than about 40% by weight, most preferably at levels of from about 20 to about 35% by weight.

Acrylic polymer, as used herein, is intended to include those polymers that contain at least one acrylic or methacrylic acid alkyl ester monomer. Block copolymers that may be used in the practice of the invention will generally be multiblock polymers wherein greater than about 50 weight % of the polymer comprise at least 2 hard blocks. Examples of useful block copolymers include those of the formula -A-B-A- and $(-A-B-)_n-X_m$. Particularly preferred are block copolymers of the formula $-[A1]-[B]-[A2]-$. In the above representative formulations, A, A1 and A2 each represents a polymer block having a glass transition temperature (Tg) of greater than about 30° C., preferably greater than 80° C., most preferably greater than 110° C., as determined by differential scanning calorimetry (DSC), B represents a polymer block having a Tg of less than about 20° C., preferably less than 0° C., most preferably less than −20° C. as determined by DSC, and X represents a multifunctional coupling agent such as silicon tetrachloride, dibromoethane and tris(nonyl phenyl) phospite.

The Tg of the acrylic blocks can be determined by differential scanning calorimetry (DSC) conducted at a heating rate of 20.0° C./minute with 5 mg or smaller samples. The Tg is calculated as the midpoint between the onset and endpoint of heat flow change corresponding to the glass transition on the DSC heat capacity heating curve. The use of DSC to determine Tg is well known in the art, and is described by B. Cassel and M. P. DiVito in "Use of DSC To Obtain Accurate Thermodynamic and Kinetic Data", American Laboratory, January 1994, pp 14-19, and by B. Wunderlich in Thermal Analysis, Academic Press, Inc., 1990.

Suitable A1 and A2 polymer blocks include polymers or copolymers derived from acrylic or methacrylic acid alkyl ester monomers such as methyl methacrylate, ethyl methacrylate, n-propyl methacrylate, isobutyl methacrylate, isobornyl acrylate, isobornyl methacrylate, isobutyl methacrylate, t-butyl methacrylate, cyclohexyl methacrylate and combinations thereof.

Suitable B polymer blocks include polymers or copolymers derived from acrylic or methacrylic acid alkyl ester monomers such as methyl acrylate, ethyl acrylate, n-propyl acrylate, isobutyl acrylate, n-butyl acrylate, n-propyl acrylate, isobutyl acrylate, sec-butyl acrylate, t-butyl acrylate, amyl acrylate, isoamyl acrylate, n-hexyl acrylate, 2-ethylhexyl acrylate, lauryl acrylate, iso-octyl acrylate, decyl methylacrylate and combinations thereof.

It is understood that the same acrylic monomers may be included in both the hard and soft blocks, and that one or more other copolymerizable monomers may be used in the preparation of the polymeric blocks. Copolymerizable olefinic monomers include but are not limited to, acrylic acid, methacrylic acid, vinyl esters, vinyl ethers, styrene monomers, and acrylamides and methacrylamides. Other olefinic comonomers may be present in amounts of up to about 25% of each block, preferably less than 10%, provided they do not interrupt the clean phase separation between the hard and soft blocks upon cooling.

It is particularly preferred to add 1-10% of adhesion promoting comonomers to the soft B block, examples of which would be acrylic acid, N-vinyl-2-pyrrolidone, acrylamide, and hydroxy ethyl acrylate.

Polymer block B will preferably be present in amounts of at least 50 weight %. In a particularly preferred embodiment, A1 and A2 is methyl methacrylate and B is n-butyl acrylate.

Methods of preparing acrylic block copolymers are known in the art. Block copolymers for use in the practice of the invention may be made by anionic polymerization as described in Japanese Kokai 11-30222617, by free radical polymerization as described by P. Mancinelli, Materiaux et Techniques, March-April 1990, pp. 41-46, by polyfunctional chain transfer agents such as described by in U.S. Pat. No. 5,679,762, by iniferter polymerization as described in EP 0 349 270 B1 and/or by free radical retrograde precipitation, as described in copending commonly assigned U.S. application Ser. No. 10/045,881. Particularly preferred are acrylic block copolymers prepared by anionic polymerization.

In addition to the acrylic block copolymers, or blends thereof, the hot melt adhesive compositions of the invention will comprise a compatible tackifier and/or plasticizer. The block copolymer, tackifier and plasticizer will be selected and used in amounts effective to produce the desired properties required for the intended end use.

Tackifying resins useful in the adhesive compositions of this invention include hydrocarbon resins, synthetic polyterpenes, rosin esters, natural terpenes, and the like. The tackifying agent will generally be present at a level of greater than about 30% by weight of the adhesive composition and preferably at a level of from about 35% by weight to about 80% by weight.

More particularly, and depending upon the particular base polymer, the useful tackifying resins may include any compatible resins or mixtures thereof such as natural and modified rosins including, for example, as gum rosin, wood rosin, tall oil rosin, distilled rosin, hydrogenated rosin, dimerized rosin, and polymerized rosin; glycerol and pentaerythritol esters of natural and modified rosins, including, for example as the glycerol ester of pale, wood rosin, the glycerol ester of hydrogenated rosin, the glycerol ester of polymerized rosin, the pentaerythritol ester of hydrogenated rosin, and the phenolic-modified pentaerythritol ester of rosin; copolymers and terpolymers of natural terpenes, including, for example, styrene/terpene and alpha methyl styrene/terpene; polyterpene resins having a softening point, as determined by ASTM method E28-58T, of from about 80° C. to 150° C.; phenolic modified terpene resins and hydrogenated derivatives thereof including, for example, the resin product resulting from the condensation, in an acidic medium, of a bicyclic terpene and a phenol; aliphatic petroleum hydrocarbon resins having a Ball and Ring softening point of from about 70° C. to 135° C.; aromatic petroleum hydrocarbon resins and the hydrogenated derivatives thereof; and alicyclic petroleum hydrocarbon resins and the hydrogenated derivatives thereof. Mixtures of two or more of the above described tackifying resins may be required for some formulations. Also included are the cyclic or acyclic $C_5$ resins and aromatic modified acyclic or cyclic resins.

Also useful are resins that are substantially aromatic. Examples of such resins can be prepared from any substantially aromatic monomers having a polymerizable unsaturated group. Typical examples of such aromatic monomers include the styrenic monomers, styrene, alphamethyl styrene, vinyl toluene, methoxy styrene, tertiary butyl styrene, chlorostyrene, etc., indene monomers including indene, and methyl indene.

Various plasticizing agents or diluents may also be present in the composition in amounts of up to about 50% by weight, preferably in amounts of from about 10 to about 45% by weight of the adhesive composition. Suitable diluents will preferably be primarily compatible with the soft (B) block of the acrylic block copolymer. Diluents are liquid or semi-solid materials with a Tg, as determined by DSC, below room temperature. These include plasticizing or extending oils and liquid tackifiers. Liquid tackifiers include rosin derivatives such as rosin alcohol, the methyl ester of rosin and the rosin ester formed by esterifying diethylene glycol with rosin. Other examples are low molecular weight hydrocarbon resins such as Wingtack 10, available from Goodyear, and Esorez 2520 available from Exxon Chemical.

Suitable plasticizing or extending oils include olefin oligomers and low molecular weight polymers as well as vegetable and animal oil and their derivatives. The petroleum derived oils which may be employed are relatively high boiling materials containing only a minor proportion of aromatic hydrocarbons (preferably less than 30% and, more particularly, less than 15% by weight of the oil). Alternatively, the oil may be totally non-aromatic. Suitable oligomers include polypropylenes, polybutenes, hydrogenated polyisoprene, hydrogenated polybutadiene, or the like having average molecular weights between about 350 and about 10,000. Examples of oils suitable for use herein include LUMINOL T350 and KAYDOL OIL, both available from Witco Corporation. Naphthenic oils, such as Calsol 5550, available from Calumet is also useful.

Other suitable diluents include aliphatic esters such as phthalic acid esters, adipic acid esters, sebacic acid esters and azelaic acid esters, paraffins such as chlorinated paraffin, and polyalkylene glycols such as polyethylene glycol, polypropylene glycol and polytetramethylene glycol as well as their random or block copolymers. Phthalic acid esters such as dibutyl phthalate, di-n-decyl phthalate, bis-2-ethyhexyl phthalate and diisodecyl phthalate, polypropylene glycol and ditridecyl adipate are particularly preferred diluents for use in the practice of the invention.

An antioxidant or stabilizer may also be included in the adhesive compositions described herein in amounts of up to about 3% by weight, more typically in amounts of about 0.5%. Among the stabilizers or antioxidants useful herein are the hindered phenols or hindered phenols in combination with a secondary antioxidant such as distearyl thiodipropionate ("DSTDP") or dilauryl thio-dipropionate ("DLTDP"). Representative antioxidants include: 1,3,5-trimethyl 2,4,6-tris (3,5-di-tert-butyl-4-hydroxybenzyl)benzene; pentaerythrityl tetrakis-3(3,5-di-tert-butyl-4-hydroxyphenyl) propionate; pentaerythritol tetrakis (3-lauryl thiodipropionate); n-octadecyl-3,5-di-tert-butyl-4-hydroxyphenol)-propionate; 4,4'-methylenebis (2,6-tert-butylphenol); 4,4'-thiobis (6-tert-butyl-o-cresol); 2,6-di-tertbutylphenol; 6-(4-hydroxyphenoxy)-2,4-bis(n-octyl-thio)-1,3,5-triazine; di-n-octadecyl 3,5-di-tert-butyl-4-hydroxy-benzylphosphonate; 2-(n-octylthio)ethyl 3,5-di-tert-butyl-4-hydroxy-benzoate; and sorbitol hexa[3-(3,5-di-tert-butyl-4-hydroxyphenyl)-propionate]. Preferred are IRGAFOS 168, a secondary antioxidant available from Ciba and IRGANOX 1010, a hindered phenol primary antioxidant available from Ciba-Geigy. Other antioxidants include ETHANOX 330, a hindered phenol from Albermarle; SANTOVAR, a 2,5 ditert-amyl hydroquinone from Monsanto; and NAUAGARD P a tris (p-nonylphenyl)phosphite from Uniroyal.

Other additives conventionally used in hot melt adhesives to satisfy different properties and meet specific application requirements also may be added to the adhesive composition of this invention. Such additives include, for example, fillers, pigments, flow modifiers, dyestuffs, which may be incorporated in minor or larger amounts into the adhesive formulation, depending on the purpose.

Hot melt adhesives may be prepared using techniques known in the art. Typically, the adhesive compositions are prepared by blending the components in the melt at a temperature of about 100° to 200° C. until a homogeneous blend is obtained, generally about two hours. Various methods of blending are known and any method that produces a homogeneous blend is satisfactory.

The adhesive may be advantageously formulated for use in, for example, medical applications, for industrial applications, positioning adhesives, bottle labeling adhesives, and elastic attachment adhesives.

The pressure sensitive adhesives of the invention may advantageously be used in the manufacture of adhesive articles including, but not limited to, industrial tapes and transfer films. The adhesive articles are useful over a wide temperature range, have improved UV resistance and adhere to a wide variety of substrates, including low energy surfaces, such as polyolefins, e.g., polyethylene and polypropylene, polyvinyl fluoride, ethylene vinyl acetate, acetal, polystyrene, powder-coated paints, and the like. Single and double face tapes, as well as supported and unsupported free films are encompassed by the invention. Also included, without limitation, are labels, decals, name plates, decorative and reflective materials, reclosable fasteners, theft prevention and anti-counterfeit devices.

In one embodiment, the adhesive article comprises an adhesive coated on at least one major surface of a backing having a first and second major surface. Useful backing substrates include, but are not limited to foam, metal, fabric, and various polymer films such as polypropylene, polyamide and polyester. The adhesive may be present on one or both surfaces of the backing. When the adhesive is coated on both surfaces of the backing, the adhesive on each surface can be the same or different.

Hot melt pressure sensitive adhesives may also be formulated that are especially suited for adhesive skin application, including transdermal drug delivery applications. Adhesives are provided that have good skin adhesion and that leave less adhesive residue on the skin. One embodiment is directed to a transdermal drug delivery system comprising an adhesive layer, a therapeutic agent and a backing layer. In one embodiment, the drug delivery system also comprises a release layer. In another embodiment of the drug delivery system the drug to be delivered is incorporated into the adhesive.

Hot melt adhesives may also be formulated for bonding a label to a container such as a bottle. Encompassed are articles comprising a label, wherein the label is attached to the article by the adhesive described herein.

The invention also provides a method for bonding a first substrate to a second substrate In one embodiment the method comprises comprising applying to a surface of at least one of a first and/or second substrate the adhesive composition of the invention. In bottle labeling applications the first substrate is a label and said second substrate is a container.

The following examples are presented for purpose of illustration and not limitation.

EXAMPLES

Sample Preparation

All the formulations were prepared in a 600 g Brabender mixer with sigma blades. In each case, the mixer was preheated to approximately 325° F. In the preparation of Comparative Samples E, F and G, the two ingredients were mixed together until homogenous. In the preparation of Comparative Samples A-D and Samples 1-13 the polymer and antioxidant were added first and mixed with about 5% of the tackifier and the diluent. Once homogenous, the tackifier was added gradually. Finally, the remaining diluent was added.

Polymers

The polymers described in Table 1 were used to prepare the Sample formulations of the Examples.

ABCP1, ABCP2, ABCP3, ABCP4, ABCP5 and ABCP6 are block copolymers prepared by anionic polymerization, as described in Japanese Kokai No.11-302617.

ABCP7, ABCP8 and ABCP9 are star polymers prepared by free radical polymerization in the presence of a multivalent chain transfer agent, as described in U.S. Pat. No. 5,679,762.

ABCP10 is a block copolymer prepared by free radical retrograde precipitation, as described in copending commonly assigned U.S. application Ser. No. 10/045,881.

TABLE 1

| Block Copolymer | % Methyl Methacrylate by Weight | % n-Butyl Acrylate by Weight | % Ethylhexyl Acrylate by Weight | Mw |
|---|---|---|---|---|
| ABCP1 | 30 | 70 | — | 67,000 |
| ABCP2 | 30 | 70 | — | 57,000 |
| ABCP3 | 30 | 70 | — | 72,000 |
| ABCP4 | 24.7 | 75.3 | — | 203,000 |
| ABCP5 | 31 | 69 | — | 160,000 |
| ABCP6 | 25 | 75 | — | 77,000 |
| ABCP7 | 25 | 75 | — | — |
| ABCP8 | 33 | 67 | — | — |
| ABCP9 | 31 | 54 | 15 | — |
| ABCP10 | 33 | 67 | — | 120,000 |

Viscosity, Loop Tack, Peel and Shear Testing

Viscosity was measured in a Brookfield viscometer, spindle #27. Adhesive films with a 2 mil thickness were made on release liner and then transferred to 2 mil PET. All bonds between adhesive and polished stainless steel plates (satin finish) were made by two passes of a 4.5 lb. roller at a rate of 12 in/min. 180° peel testing was performed with a 20 minute dwell on plates. Films (1"×5") were pulled at a rate of 12 in/min. Shear testing included a 15 minute dwell on plates. A bonded area of 1"×1" and 2 kg weight (Sample 4), 0.5 kg weight (Sample 13) or 1 kg weight (Sample 14) used. A TMI Looptack Tester analyzed loop tack on 1" strips of adhesive. All testing conditions were 23° C. and 50% relative humidity.

Rheology

A Rheometrics Dynamic Mechanical Analyzer (Model RDA 700) was used to obtain the elastic (G') and loss (G") moduli versus temperature. The instrument was controlled by Rhios software version 4.3.2. Parallel plates 8 mm in diameter and separated by a gap of about 2 mm were used. The sample was loaded and then cooled to about −100° C. and the test started. The program test increased the temperature at 5° C. intervals followed by a soak time at each temperature of 10 seconds. The convection oven containing the sample was flushed continuously with nitrogen. The frequency was maintained at 10 rad/s. The initial strain at the start of the test was 0.05% (at the outer edge of the plates). An autostrain option in the software was used to maintain an accurately measurable torque throughout the test. The option was configured such that the maximum applied strain allowed by the software was 50%. The autostrain program adjusted the strain at each temperature increment if warranted using the following procedure. If the torque was below 200 g-cm the strain was increased by 25% of the current value. If the torque was above 1200 g-cm it was decreased by 25% of the current value. At torques between 200 and 1200 g-cm no change in strain was made at that temperature increment. The shear storage or elastic modulus (G') and the shear loss modulus (G") are calculated by the software from the torque and strain data. Their ratio, G"/G', also known as the tan delta, was also calculated.

Example 1

Adhesive formulations containing different levels of polymer were compared. The polymer used was ABCP1. The tackifier used was KE-311, a disproportionated and hydrogenated rosin ester with a softening point of 95° C., available from Arakawa Chemical Industries, Co. Plasthall® DIDA (diisodecyl adipate), available from C.P. Hall Co., was used as the diluent.

The amounts of components used to prepare each Sample formulation are shown in Table 2. In addition to the components shown in Table 2, each formulation also contained 0.2-0.5 weight percent of an antioxidant (Irganox 1010, available from Ciba Specialty Chemicals Corp.).

TABLE 2

| Adhesive Sample | ABCP1 | KE-311 | DIDA |
|---|---|---|---|
| Sample 1 | 35 | 50 | 15 |
| Sample 2 | 42 | 50 | 8 |
| Sample 3 | 45.5 | 45.5 | 9 |
| Sample A | 50 | 40 | 10 |
| Sample B | 56 | 44 | — |
| Sample C | 62.5 | 37.5 | — |
| Sample D | 70 | 30 | — |

Adhesive formulations prepared in accordance with the invention (Samples 1-3) were compared with adhesive formulations containing a high level (i.e., 50% or more by weight of the adhesive formulation) of polymer (Samples A-D).

Adhesive Samples 1-3 were all usable pressure sensitive adhesives with acceptable viscosities. Adhesive Sample 3 was a strong, rubbery, pressure sensitive adhesive. While Adhesive Sample 2 was a stiffer product with less aggressive tack, it was still useable as a pressure sensitive adhesive. Adhesive Sample 1 was a soft, strong, pressure sensitive adhesive.

In contrast, the use of a high level of polymer and a low level of rosin ester (Sample D) resulted in a clear, stiff material with low tack. With a decreased level of polymer and increased level of rosin ester (Samples C and B) the material was more stiff and lost its pressure sensitive properties. The introduction of diisodecyl adipate (Sample A) decreased viscosity but did not have much effect on adhesive properties.

Example 2

Adhesive formulations containing various levels of different polymers, tackifiers and diluents were compared. The components and amounts used to prepare each Sample formulation and the resulting viscosity are shown in Table 3.

TABLE 3

| Adhesive Sample | Block Copolymer | Tackifier | Diluent | Viscosity @ 325° F. |
|---|---|---|---|---|
| Sample 4 | 29.1% ABCP1 | 58.4% KE-311 | 12.5% DIDA | 800 |
| Sample 5 | 29.1% ABCP3 | 58.4% KE-100 | 12.5% DTDA | 3,800 |
| Sample 6 | 29.1% ABCP9 | 58.4% KE-100 | 12.5% DTDA | 2,000 |
| Sample 7 | 40% ABCP9 | 49% KE-100 | 11% DTDA | 6,800 |
| Sample 8 | 28.7% ABCP2 | 56.4% Kristalex 3085 | 14.9% DTDA | 425 |

TABLE 3-continued

| Adhesive Sample | Block Copolymer | Tackifier | Diluent | Viscosity @ 325° F. |
|---|---|---|---|---|
| Sample 9 | 24% ABCP4 | 45% Kristalex 3085 | 31% DTDA | 7,000 |
| Sample 10 | 18% ABCP4 6% ABCP8 | 45% Kristalex 3085 | 31% DTDA | 2,250 |
| Sample 11 | 20% ABCP10 | 46% Kristalex 3085 | 34% DTDA | 208,000 (@ 400° F.) |
| Sample 12 | 24% ABCP4 | 42% KE-100 | 34% Poly-G 20-28 | 121,500 |
| Sample 13 | 24% ABCP4 | 42% KE-100 | 34% Poly-G 26-150 | 1,500 |
| Sample 14 | 31% ABCP5 | 45% KE-100 | 27% Poly-G 26-150 | 18,600 |
| Sample E | 80% ABCP7 | 20% Foral 85 | — | 252,500 |
| Sample F | 80% ABCP7 | 20% Kristalex 3085 | — | 130,500 |
| Sample G | 60% ABCP7 | 40% Kristalex 3085 | — | 19,150 |
| Sample H | 50% ABCP6 | 50% Kristalex 3085 | — | 7700 |
| Sample I | 50% ABCP6 | 50% KE-100 | — | 22,800 |

Kristalex 3085 is an α-methyl styrene resin with a softening point of 85° C., available from Hercules Inc.
KE-100 is a disproportionated rosin ester with a softening point of 100° C., available from Arakawa Chemical Industries, Co.
KE-311 is a disproportionated and hydrogenated rosin ester with a softening point of 95° C., available from Arakawa Chemical Industries, Co.
Foral 85 is a hydrogenated rosin ester with a softening point of 85° C., available from Hercules Inc.
Plasthall ® DTDA (ditridecyl adipate) and Plasthall ® DIDA (diisodecyl adipate) are available from C. P. Hall Co.
Poly-G ® 20-28 and Poly-G ® 26-150 (polypropylene glycol of molecular weights 4000 and 775, respectively) are available from Arch Chemicals, Inc.
Irganox 1010 is an antioxidant, available from Ciba Specialty Chemicals Corp.

Properties of various formulations shown in Table 3 are set forth in Tables 4 and 5. In addition to G' and tan delta, Table 4 shows the temperature at which tan delta=1. For block copolymer-based adhesives tan delta generally is very low at low temperatures, increases with temperature to a reach a maximum at the mid-block Tg, usually at a value for tan delta of >1, then decreases as the temperature is raised further to a level below about 0.8 in the rubbery region, and finally increases to a value above 1 at very high temperatures in the flow region—which occurs when the hard blocks have softened. If the hot melt adhesive composition exhibits a tan delta curve which does not drop below about 0.8 in the rubbery region it will have inadequate resistance to edge ooze during storage when in the form of rolls of pressure sensitive adhesive tape. The temperature cited in Table 4 is the lowest temperature at which tan delta reaches 1 and never again falls below 0.8 as the temperature is raised further. When tan delta=1 a material's mechanical response is equally viscous and elastic. When this temperature is below the mid-block Tg, it is an indication of poor resistance to cold flow or edge ooze. Higher temperatures indicate greater resistance to heat and pressure. The RDA scan of adhesive Sample 4 is shown in FIG. 1.

TABLE 4

| Adhesive Sample | Mid-Block Tg (° C.) | G' (25° C.) $10^5$ dynes/cm² | tan delta (25° C.) | T (° C.) at which tan delta = 1 |
|---|---|---|---|---|
| Sample 1 | 2 | 3.2 | 0.59 | 104 |
| Sample 4 | 12 | 4.4 | 2.26 | 104 |
| Sample 5 | 17 | 7.68 | 3.13 | 123 |
| Sample 6 | 16 | 4.93 | 4.18 | 0 |
| Sample 7 | 12 | 4.51 | 2.09 | −4 |
| Sample 8 | 22 | 9.58 | 3.18 | 3 |
| Sample 9 | −15 | 1.05 | 0.41 | 131 |
| Sample 10 | −14 | 0.52 | 0.52 | 125 |
| Sample 11 | −14 | 0.48 | 0.42 | >200 |
| Sample 12 | −10 | 0.93 | 0.59 | 148 |
| Sample 13 | −13 | 0.65 | 0.44 | 102 |
| Sample 14 | −2 | 0.61 | 0.54 | 125 |

TABLE 4-continued

| Adhesive Sample | Mid-Block Tg (° C.) | G' (25° C.) $10^5$ dynes/cm² | tan delta (25° C.) | T (° C.) at which tan delta = 1 |
|---|---|---|---|---|
| Sample E | −8 | 7.22 | 0.79 | 130 |
| Sample F | 0 | 14.3 | 0.92 | 12 |
| Sample G | 20 | 46.3 | 1.89 | 5 |
| Sample H | 39 | 650 | 1.26 | 21 |
| Sample I | 29 | 160 | 2.64 | 125 |

TABLE 5

| Adhesive Sample | 180° Peel (lbs/in) | Loop Tack (oz/in²) | Shear (hrs) |
|---|---|---|---|
| Sample 4 | 6.1 | 105 | >140 |
| Sample 13 | 0.14 | 13 | 6 |
| Sample 14 | 1.4 | 29 | 67 |

Comparative Samples E, F and G contained high levels of polymer. Sample E formed an opaque substance. Sample F resulted in a clear adhesive. Both Sample E and F exhibited light tack at room temperature but were too stiff for pressure sensitive adhesive applications. Sample G was not tacky and was very stiff (high G'). Samples H and I were clear and flexible, but hard, with no pressure sensitivity.

Samples 4-14 show that low levels of polymer can be utilized to form acceptable pressure sensitive adhesives. By altering the amount of ingredients the properties of the adhesive can be tailored to a desired end use. Samples having a desired level of tack, grab, softness, heat resistance, etc., can be formulated using low levels of polymer. For example, Sample 4 was found to be an aggressive pressure sensitive adhesive having properties making this formulation an excellent candidate for use in industrial tapes. Samples 13 and 14 were found to be soft adhesives with excellent grab on skin, but painless removal, and having high moisture vapor transmission making these formulations excellent candidates for use as skin adhesives.

These examples also show that the method of preparing the block copolymers have a significant effect on the adhesive properties. Formulations prepared using acrylic block copolymers prepared by anionic means exhibit the best combination of hot melt adhesive properties. Samples 6 and 7 contain acrylic block copolymers prepared by free radical chemistry using polyfunctional chain transfer agents. These adhesives are sufficiently soft (low G') and viscous (high tan delta) in their response to deformation that they bond adequately and strongly. In addition the viscosity of these adhesives is sufficiently low (<50,000 cP at a reasonable application temperature) to allow them to be applied as hot melts. However, their heat resistance is low (T at which tan delta=1) which limits the applications for which they are suitable. Sample 11, which uses an acrylic block copolymer prepared via free radical retrograde polymerization exhibited outstanding heat resistance and good adhesion, but is too viscous for most conventional hot melt application equipment. Thus while useful adhesives can be formulated from any of these block copolymers at <50% polymer, the best overall adhesive properties are obtained from those polymerized anionically.

Many modifications and variations of this invention can be made without departing from its spirit and scope, as will be apparent to those skilled in the art. The specific embodiments described herein are offered by way of example only, and the invention is to be limited only by the terms of the appended claims, along with the full scope of equivalents to which such claims are entitled.

The invention claimed is:

1. A transdermal drug delivery device comprising an adhesive layer, a therapeutic agent and a backing layer, wherein the adhesive layer consists of an adhesive composition comprising from about 20 to about 35% by weight, based on the weight of the adhesive composition, of an acrylic block copolymer.

2. The transdermal drug delivery device of claim 1 wherein the adhesive composition comprises said therapeutic agent.

3. The transdermal drug delivery device of claim 2 wherein the therapeutic agent is a drug.

4. The transdermal drug delivery device of claim 1 further comprising a release liner.

5. The transdermal drug delivery device of claim 1 wherein the block copolymer has the formula:

-[A1]-[B]-[A2]- wherein A1 and A2 each represents a polymer block having a glass transition temperature (Tg) of greater than about 30° C. and B represents a polymer block having a glass transition temperature of less than about 20° C.

6. The transdermal drug delivery device of claim 5 wherein polymer block B is present in amounts of at least about 50 weight % based on the weight of the total polymer.

7. The transdermal drug delivery device of claim 5 wherein polymer blocks A1 and A2 are methyl methacrylate and polymer block B is n-butyl acrylate.

8. The transdermal drug delivery device claim 1 wherein the adhesive composition comprises, based on the weight of the adhesive composition, from about 20 to about 35 wt % of an acrylic block copolymer, from about 35 to about 80 wt % of a tackifier, and from about 10 to about 45 wt % of a diluent.

9. The transdermal drug delivery device of claim 1 wherein the block copolymer is prepared by anionic polymerization.

* * * * *